US008069566B2

(12) United States Patent  
Linnenbrink

(10) Patent No.: US 8,069,566 B2
(45) Date of Patent: Dec. 6, 2011

(54) OPERATING METHOD FOR IMPROVING THE RUNNING BEHAVIOR OF GEARWHEELS AND BURNISHING DEVICE FOR PERFORMING THE METHOD

(76) Inventor: Wolfgang Linnenbrink, Warburg (DE)

(*) Notice: Subject to any disclaimer, the term of this patent is extended or adjusted under 35 U.S.C. 154(b) by 829 days.

(21) Appl. No.: 12/053,078

(22) Filed: Mar. 21, 2008

(65) Prior Publication Data

US 2009/0031544 A1 Feb. 5, 2009

(30) Foreign Application Priority Data

Aug. 3, 2007 (EP) .................................... 07015322

(51) Int. Cl.
*B23P 15/14* (2006.01)
(52) U.S. Cl. .... 29/893.3; 29/90.01; 29/90.6; 29/893.35; 29/557; 29/407.05; 451/47; 451/65; 451/66; 451/67; 409/4; 409/345
(58) Field of Classification Search ............. 29/90.01, 29/90.6, 893, 893.3, 893.35, 557, 407.05; 451/47, 65, 66, 67; 409/4, 345
See application file for complete search history.

(56) References Cited

U.S. PATENT DOCUMENTS

| | | | | |
|---|---|---|---|---|
| 1,912,216 A * | 5/1933 | Page | ................................ | 451/47 |
| 2,352,557 A * | 6/1944 | Miller | ............................... | 409/31 |
| 2,353,861 A * | 7/1944 | Wallace | ........................... | 451/47 |
| 3,103,143 A * | 9/1963 | Perger | ............................... | 409/4 |
| 3,782,041 A * | 1/1974 | Batorski | ....................... | 451/123 |
| 4,305,190 A * | 12/1981 | Flair | ............................... | 29/90.6 |
| 4,309,802 A * | 1/1982 | Jorgensen | ...................... | 29/90.6 |
| 4,414,780 A * | 11/1983 | Jorgensen | ...................... | 451/114 |
| 4,920,703 A * | 5/1990 | Hosoya | ............................ | 451/47 |
| 5,857,896 A * | 1/1999 | Stollberg | ......................... | 451/47 |
| 6,840,720 B2 * | 1/2005 | Mall | .................................. | 409/8 |
| 6,951,501 B2 * | 10/2005 | Tan | ................................... | 451/5 |
| 7,004,826 B2 * | 2/2006 | Linnenbrink | ................. | 451/194 |

(Continued)

FOREIGN PATENT DOCUMENTS

DE 2306780 8/1974

(Continued)

OTHER PUBLICATIONS

European Search Report, dated Oct. 31, 2007.

*Primary Examiner* — Derris Banks
*Assistant Examiner* — Azm Parvez
(74) *Attorney, Agent, or Firm* — Laurence A. Greenberg; Werner H. Stemer; Ralph E. Locher

(57) ABSTRACT

An operating method improves the running behavior of gearwheels negatively noticed upon gearwheel testing and is performed by a burnishing device. The gearwheels that were rejected from the production process may be optimized rapidly and in a targeted way so that they may be returned back into the production process. The tooth flanks of a gearwheel to be machined are, in a first method step, mechanically freed of particles adhering to the surfaces of the tooth flanks or slight protrusions protruding therefrom using a first gearwheel machining tool having a machining wheel coated with an abrasive agent. Subsequently, in a second method step in a second gearwheel machining tool known as a burnishing machine, the gearwheel is chucked between gearwheel-shaped rolling tools, the so-called burnishing wheels, and rolled without material abrasion.

10 Claims, 1 Drawing Sheet

U.S. PATENT DOCUMENTS

2005/0130570 A1 * 6/2005 von Schumann ............. 451/184

FOREIGN PATENT DOCUMENTS

| | | |
|---|---|---|
| DE | 2711282 A1 | 9/1978 |
| DE | 3827175 A1 | 3/1989 |
| DE | 10027011 A1 | 12/2001 |
| EP | 1582277 A1 | 10/2005 |
| GB | 1392704 | 4/1975 |
| GB | 1565035 | 4/1980 |

* cited by examiner

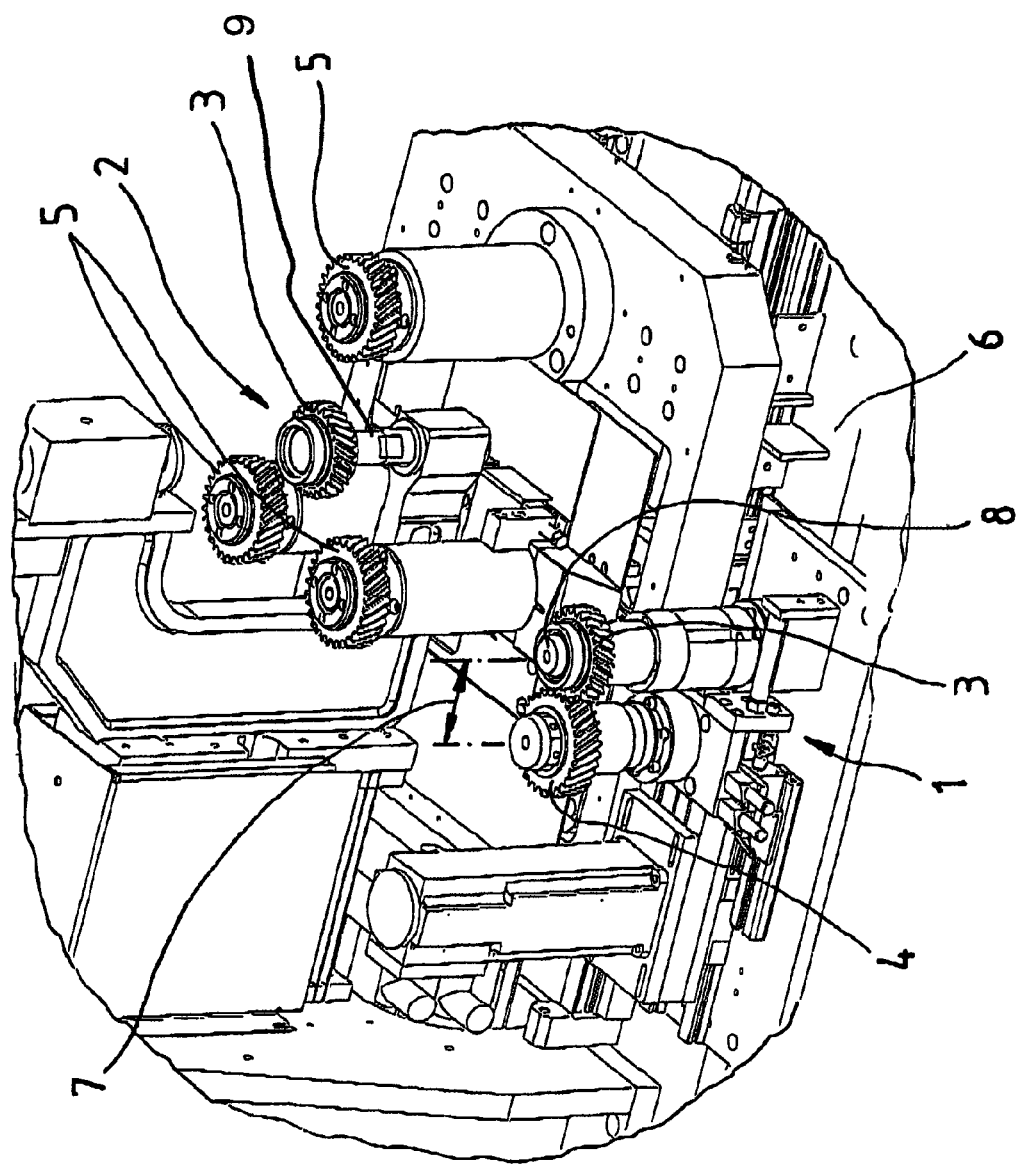

OPERATING METHOD FOR IMPROVING THE RUNNING BEHAVIOR OF GEARWHEELS AND BURNISHING DEVICE FOR PERFORMING THE METHOD

CROSS REFERENCE TO THE RELATED APPLICATION

This application claims the priority, under 35 U.S.C. §119, of European application EP 07 015 322.6, filed Aug. 3, 2007; the prior application is herewith incorporated by reference in its entirety.

BACKGROUND OF THE INVENTION

FIELD OF THE INVENTION

The present invention relates to a method for improving the operating behavior of gearwheels and a burnishing device for performing the method.

In the production of gearwheels, in particular of motor vehicle transmissions, it is typical to test the produced gearwheels completely automatically or semi-automatically for mechanical and acoustic peculiarities via gearwheel testing devices. To ensure optimal gearing quality and the lowest possible noise of the transmission, peculiar gearwheels are rejected from the production process. To be able to still use such rejected gearwheels, however, the attempt has been made to be able to return them into the production process by different operating methods in greatly varying devices. This is performed, for example, by a known device for burnishing gearwheels, which is disclosed in published, European patent application EP 1 582 277 A1 (corresponding to U.S. Pat. No. 7,004,826), in which gearwheels to be machined are chucked between gearwheel-shaped rolling tools, so-called burnishing wheels, and rolled without material abrasion, slight protrusions on the tooth flanks being at least partially or completely pressed away plastically, for example. If such burnishing of a gearwheel to be machined does not suffice, the surface of the tooth flanks may be ground back to the desired tooth flank shape again by careful milling or grinding of so-called nicks, minimal ejections and fine notches. Burrs and other small protrusions, adhering scale of a prior heat treatment, or other particles may also be removed again more or less by grinding.

The known operating methods for improving the operating behavior of gearwheels have the disadvantage that the burnishing devices used may often only be used alternatively and, if possible at all, have to be reconfigured in a time-consuming way if they are to be reconfigured from an abrasive grinding process for removing nicks to a roll-burnishing device free of material abrasion.

BRIEF SUMMARY OF THE INVENTION

It is accordingly an object of the invention to provide a method for improving the operating behavior of gearwheels and a burnishing device for performing the method that overcomes the above-mentioned disadvantages of the prior art devices and methods of this general type, which reworks gearwheels rejected from the production process and is optimized in a rapid and targeted way so that they may be returned back into the production process. The invention further provides a burnishing device for performing the method, which may perform the work to be executed rapidly and simply, without complex reconfiguration measures or great logistical outlay such as transport or temporary storage being necessary.

With the foregoing and other objects in view there is provided, in accordance with the invention, a method for improving operating behavior of gearwheels by removing flaws on the gearwheels noticed during gearwheel testing. The method includes the steps of placing a gearwheel in a first gearwheel machining tool having a machine wheel coated with an abrasive agent; operating the first gearwheel machining tool for mechanically freeing from tooth flanks of the gearwheel scaling adhering to surfaces of the tooth flanks from a prior heat treatment, other particles and/or slight protrusions protruding therefrom including nicks, damage arising during an operating process in a form of minimal ejections, fine notches and/or burrs by bringing the gearwheel and the machine wheel into engagement with one another and being pivoted, under a braking load of the gearwheel being a non-driven wheel or without a braking load, with mutual clamping against one another; and subsequently placing the gearwheel in a second gearwheel machining tool being a burnishing machine having gearwheel-shaped rolling tools being burnishing wheels where the gearwheel is chucked between the burnishing wheels and rolled without material abrasion.

The operating method for improving the running behavior, in particular the acoustic behavior of gearwheels, is characterized in that the tooth flanks of a gearwheel to be machined are, in a first method step, freed mechanically from flaws protruding from the surfaces of the tooth flanks, such as so-called nicks, minimal ejections and fine notches, burrs, or other small protrusions or scale adhering thereto from a prior heat treatment or other particles, more or less by grinding, in a first gearwheel machining tool having a machining wheel coated with abrasive agent, such as diamonds. Such nicks may arise on the surfaces of the tooth flanks during the operating process, for example, during transport or handling of the work pieces.

The damage reduction is performed in that both wheels are brought into engagement with one another and, with a braking load of the non-driven wheel or without a braking load, but clamped against one another, are pivoted, so that a single-flank or double-flank machining of the tooth flanks occurs as needed. In the following second method step, in a second gearwheel machining tool known as a burnishing tool, the gearwheel to be machined is chucked between gearwheel-shaped rolling tools, the so-called burnishing wheels, and rolled without material abrasion, a plastic deformation of protrusions still protruding above the tooth flanks more or less occurring, fine notches also being filled up again in addition to minimal ejections, so that significant surface improvement of the tooth flanks occurs, the machined gearwheels often proving to correspond to the required tolerances again after another passage through a gearwheel testing device.

The operating method according to the present invention especially has the advantage that depending on the type of the detected flaw of the gearwheel testing, a flawed gearwheel may only be fed to the first tooth machining tool or only the second tooth machining tool or first the first and subsequently the second tooth machining tool, so that only the actually required operating steps of the operating method have to be performed as a function of the actually established flaws of a gearwheel, which further increases the cost-effectiveness of the operating method. Reequipping a single gearwheel machining tool is unnecessary and transport and temporary storage are unneeded due to the directly neighboring configuration, so that the burnishing device according to the present invention operates extremely efficiently and cost-effectively.

The burnishing device itself is distinguished in that the first and the second gearwheel machining tool are situated directly adjacent to one another or even adjacent to one another in a shared machined frame, by which all gearwheels rejected for later optimization may be kept directly accessible and immediately operationally ready for known devices. The second machining tool is able to finish machining a gearwheel which has already been machined in the first gearwheel machining tool, which now simultaneously pre-machines the next gearwheel to be optimized. Reequipping a single device from one with material abrasion to one without material abrasion is thus advantageously avoided.

Because the axial distance between the rotational axis of the machining wheel of the first gearwheel machining tool and the rotational axis of the gearwheel to be machined is constant for any gearwheel pair to be machined, single-flank contact of the gearwheel to be machined may be produced, its free rotation being braked by a supporting torque in its mounting.

In another embodiment of the first gearwheel machining tool, the axial distance between the rotational axis of the machining wheel and the rotational axis of the gearwheel to be machined may be varied, so that a double-flank contact of the two participating wheels subject to pressure may be produced, the wheels experiencing a mutual relative movement of the participating tooth flanks. The machining wheel of the first gearwheel machining tool is advantageously diamond-coated, so that the surface of the tooth flanks may be re-machined abrasively, i.e., removing material, either the machining wheel or the gearwheel to be machined also being able to be mounted so it is able to oscillate, as the machining wheel or the gearwheel to be machined may be chucked rigidly or oscillating therein.

According to a further advantageous embodiment of the present invention, the second gearwheel machining tool is equipped with three identical or different burnishing wheels, each burnishing wheel being able to optimize different areas of a tooth in the latter case. It is also advantageously possible here that the gearwheel to be machined is mounted so it may be oscillated in the second gearwheel machining tool and the burnishing wheels are suspended oscillating if necessary.

Other features which are considered as characteristic for the invention are set forth in the appended claims.

Although the invention is illustrated and described herein as embodied in a method for improving the operating behavior of gearwheels and a burnishing device for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, partial perspective view of a burnishing device according to the invention.

DETAILED DESCRIPTION OF THE INVENTION

Referring now to the single FIGURE of the drawing in detail, there is shown a gearwheel 3 rejected from a production process that is first placed on a chucking arbor 8 of a first gearwheel machining tool 1 to optimize its gearing quality and reduce its running noise. The gearwheel 3 engages with a diamond-coated machining wheel 4, the surfaces of tooth flanks of the gearwheel 3 being mechanically freed of flaws projecting therefrom or adhering thereto, such as minimal ejections, fine notches, burrs, slight protrusions, adhering scale, and other particles. This very fine grinding process has no influence on the actual tooth shape of the gearwheel 3, but rather only on removing projecting damage from the surfaces of the tooth flanks. Subsequently, the gearwheel 3 is removed from the chucking arbor 8 of the first gearwheel machining tool 1 and placed on a support 9 of the second machining tool 2, which has three identical or different burnishing wheels 5, which may be advanced radially to the gearwheel 3 and burnish the faces of the tooth flanks like rolling tools while applying a contact pressure, in that slight protrusions which still protrude are pressed away by a plastic deformation without material abrasion, which causes significant surface improvement, in particular after the completed grinding procedure in the first gearwheel machining tool 1.

Subsequently, the machined gearwheel 3 may be removed and supplied to a testing machine again, whose result after successful machining of the gearwheel 3 is to have resulted in the gearwheel 3 being able to return into the production process. Otherwise, the gearwheel may pass through the operating method according to the present invention a further time or must finally be considered a discard.

The invention claimed is:

1. A burnishing device for reworking gearwheels by removing flaws on the gearwheels noticed during gearwheel testing, the burnishing device comprising:

a first gearwheel machining tool having a machining wheel coated with an abrasive agent, said first gearwheel machining tool being operated for mechanically freeing from tooth flanks of the gearwheel at least one of scaling adhering to surfaces of the tooth flanks from a prior heat treatment, other particles and slight protrusions protruding therefrom including nicks, damage arising during an operating process in a form of minimal ejections, fine notches and burrs by bringing the gearwheel and said machining wheel into engagement with one another and being pivoted, under a braking load of the gearwheel being a non-driven wheel or without a braking load, with mutual clamping against one another; and a second gearwheel machining tool being a burnishing machine having gearwheel-shaped rolling tools being burnishing wheels where the gearwheel is chucked between said burnishing wheels and rolled without material abrasion, said first and second gearwheel machining tools disposed adjacent to one another.

2. The burnishing device according to claim 1, wherein an axial distance between a rotational axis of said machining wheel and a rotational axis of the gearwheel to be machined is fixed in said first gearwheel machining tool and a single-flank contact of the gearwheel to be machined is produced.

3. The burnishing device according to claim 1, wherein an axial distance between a rotational axis of said machining wheel and a rotational axis of the gearwheel to be machined in said first gearwheel machining tool is variable and a double-flank contact of the gearwheel and said machining wheel is produced.

4. The burnishing device according to claim 1, wherein said machining wheel of said first gearwheel machining tool is diamond-coated.

5. The burnishing device according to claim 1, wherein one of said machining wheel and the gearwheel to be machined is mounted so that it may be oscillated.

6. The burnishing device according to claim 1, wherein at least one of a rotational axis of said machining wheel and a rotational axis of the gearwheel to be machined are implemented as one of rigid and oscillating.

7. The burnishing device according to claim 1, wherein said burnishing wheels are three identical burnishing wheels.

8. The burnishing device according to claim 1, wherein the gearwheel to be machined is mounted in said second gearwheel machining tool so that it may be oscillated.

9. The burnishing device according to claim 1, wherein said burnishing wheels are three different burnishing wheels.

10. The burnishing device according to claim 1, further comprising a shared machine frame housing said first and second gearwheel machining tools disposed directly adjacent to another in said shared machine frame.

* * * * *